United States Patent
Ren

(10) Patent No.: US 8,176,729 B2
(45) Date of Patent: May 15, 2012

(54) PERTURBATION CONTROL STRATEGY FOR LOW-TEMPERATURE UREA SCR NOX REDUCTION

(75) Inventor: Shouxian Ren, Ann Arbor, MI (US)

(73) Assignee: GM Global Technology Operations LLC

( * ) Notice: Subject to any disclaimer, the term of this patent is extended or adjusted under 35 U.S.C. 154(b) by 627 days.

(21) Appl. No.: 12/043,241

(22) Filed: Mar. 6, 2008

(65) Prior Publication Data

US 2009/0223207 A1    Sep. 10, 2009

(51) Int. Cl.
*F01N 3/00*    (2006.01)

(52) U.S. Cl. .............. 60/286; 60/274; 60/297; 60/301; 60/303

(58) Field of Classification Search ............... 60/274, 60/286, 297, 299, 301, 303, 295
See application file for complete search history.

(56) References Cited

U.S. PATENT DOCUMENTS

| | | | | |
|---|---|---|---|---|
| 6,125,629 A * | 10/2000 | Patchett | ............ | 60/286 |
| 6,199,374 B1 * | 3/2001 | Hirota et al. | ............ | 60/277 |
| 6,863,874 B1 * | 3/2005 | Twigg | ............ | 423/210 |
| 6,928,806 B2 * | 8/2005 | Tennison et al. | ............ | 60/286 |
| 7,082,753 B2 * | 8/2006 | Dalla Betta et al. | ............ | 60/286 |
| 7,735,313 B2 * | 6/2010 | Osumi et al. | ............ | 60/285 |

* cited by examiner

*Primary Examiner* — Binh Q Tran

(57) ABSTRACT

An emissions control method may include injecting a fuel into an engine exhaust gas provided to a diesel oxidation catalyst (DOC) when a DOC operating temperature is greater than a first limit, terminating the injecting when a temperature of a catalyst in communication with exhaust gas exiting the DOC is greater than a second limit, and injecting a dosing agent into the exhaust gas after the terminating.

18 Claims, 3 Drawing Sheets

US 8,176,729 B2

PERTURBATION CONTROL STRATEGY FOR LOW-TEMPERATURE UREA SCR NOX REDUCTION

FIELD

The present disclosure relates to exhaust treatment systems, and more particularly to NOx emissions reduction.

BACKGROUND

The statements in this section merely provide background information related to the present disclosure and may not constitute prior art.

Selective catalytic reduction (SCR) catalysts and diesel oxidation catalysts (DOC) are commonly used with diesel engines for emissions reduction. In the SCR process, NOx reacts with a reductant which is injected by a dosing system into the flue or exhaust gas stream to be absorbed onto a SCR catalyst. The injected dosing agent (e.g. urea) breaks down to form ammonia (NH3), which is the reductant utilized to react with the NOx producing nitrogen (N2) and water (H2O).

However, the SCR process typically requires relatively high exhaust gas temperatures, such as temperatures greater than 220° C. In conventional diesel applications, relatively low exhaust gas temperatures, such as temperatures less than 220° C., can be experienced frequently. Therefore, external heating devices may be used to maintain SCR catalyst temperatures during periods of low exhaust gas temperature.

SUMMARY

An emissions control method may include injecting a fuel into an engine exhaust gas provided to a diesel oxidation catalyst (DOC) when a DOC operating temperature is greater than a first limit, terminating the injecting when a temperature of a catalyst in communication with exhaust gas exiting the DOC is greater than a second limit, and injecting a dosing agent into the exhaust gas after the terminating.

The catalyst may include a selective catalytic reduction (SCR) catalyst and the dosing agent injection may be terminated when the SCR catalyst temperature is less than a third limit. Injection of the fuel may begin again after termination of the dosing agent injection when the DOC operating temperature is greater than the first limit.

A control module may include a diesel oxidation catalyst (DOC) control module, a selective catalytic reduction (SCR) catalyst control module, and a dosing agent control module. The DOC control module may control a temperature of a DOC in communication with an exhaust gas from an engine. The SCR catalyst control module may be in communication with the DOC control module and may control a temperature of a SCR catalyst by selectively injecting a fuel into the exhaust gas provided to the DOC when the DOC temperature is greater than a first limit. The SCR catalyst control module may terminate the injecting when the SCR catalyst temperature is greater than a second limit. The dosing agent control module may be in communication with the SCR catalyst control module and may control injection of the dosing agent into the exhaust gas after the terminating.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
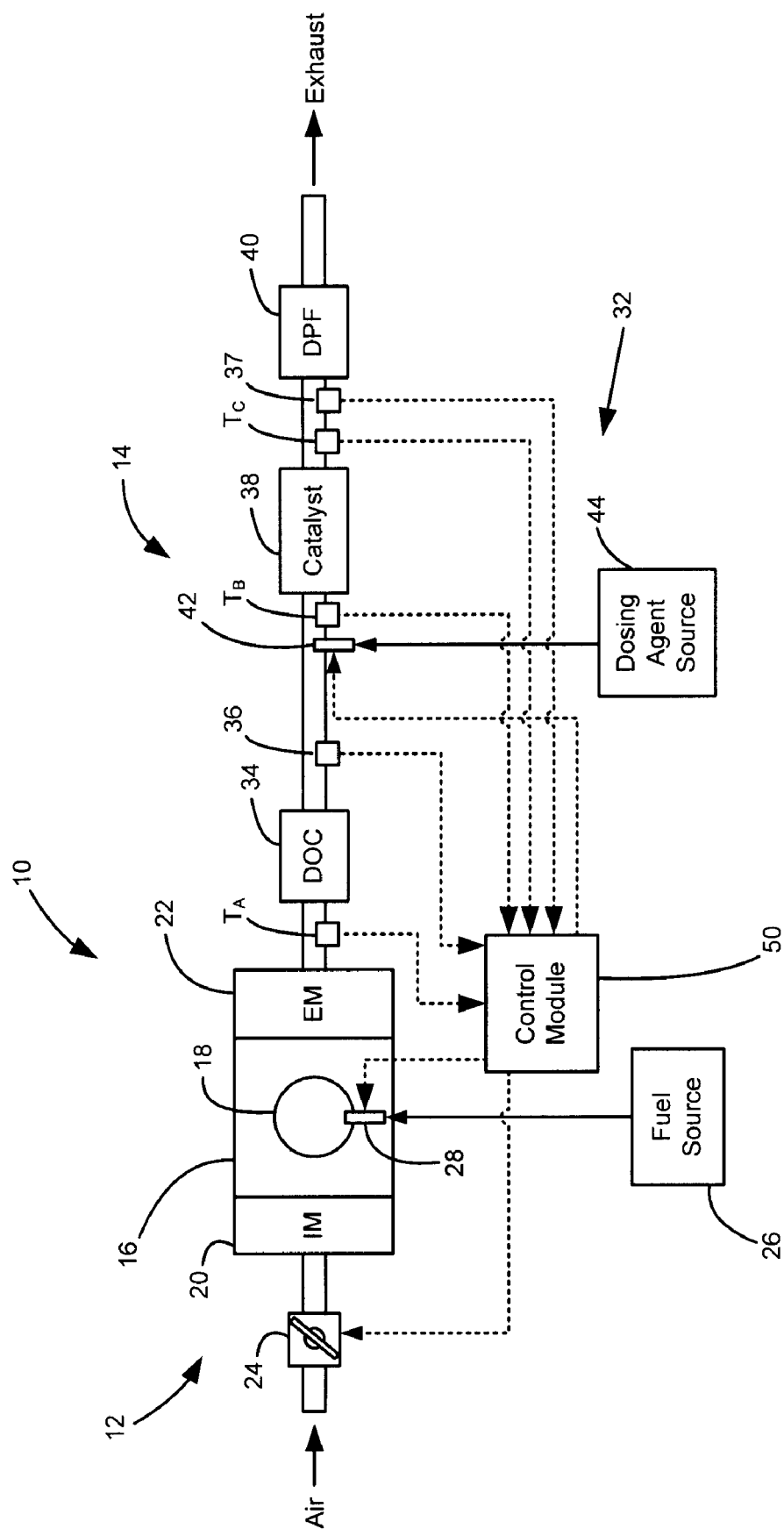
FIG. 1 is a schematic illustration of a vehicle according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is schematically illustrated. Vehicle 10 may include an engine assembly 12 and an exhaust after-treatment system 14. Engine assembly 12 may include an engine 16 having a cylinder 18, an intake manifold 20 and an exhaust manifold 22. Air flows into intake manifold 20 through a throttle 24. The air is mixed with fuel and the air and fuel mixture is combusted within cylinder 18 to drive a piston (not shown). Although a single cylinder 18 is illustrated, it is appreciated that engine 16 may include additional cylinders 18. For example, engines having 2, 3, 4, 5, 6, 8, 10, 12 and 16 cylinders are anticipated. The fuel is provided from a fuel source 26 and is injected into the air stream using an injector 28.

Exhaust is produced through the combustion process and is exhausted from cylinder 18 into exhaust manifold 22. Exhaust after-treatment system 14 treats the exhaust flowing therethrough to reduce emissions before being released to the atmosphere. Exhaust after-treatment system 14 may include a dosing system 32, a diesel oxidation catalyst (DOC) 34, first and second NOx sensors 36, 37, a selective catalytic reduction (SCR) catalyst 38, and a diesel particulate filter (DPF) 40. First and second NOx sensors 36, 37 may be responsive to a NOx level of the exhaust and may generate respective signals based thereon.

Temperature sensors $T_A$, $T_B$ and $T_C$ may be located along the exhaust path. Temperature sensor $T_A$ may located upstream of DOC 34 at an inlet thereof and temperature sensor $T_B$ may be located downstream of DOC 34 and upstream of SCR catalyst 38 at an inlet thereof. Temperature sensor $T_C$ may be located downstream of SCR catalyst 38. DOC 34 reacts with the exhaust to reduce emission levels of the exhaust. DPF 40 may be located downstream from SCR catalyst 38 and may filter diesel particulates to further reduce emissions.

Dosing system 32 may include a dosing agent injector 42 and a dosing agent storage tank 44. The dosing system 32 may selectively inject a dosing agent into the exhaust stream to further reduce emissions. For example, dosing agent storage tank 44 may include a supply of urea that is injected into the exhaust stream by dosing agent injector 42, as discussed below. The rate at which the dosing agent is injected into the exhaust stream may be determined based on the signals generated by one or more of the various sensors described herein.

First and second NOx sensors 36, 37 may be used to determine NOx conversion efficiency and to determine proper urea dosing quantities as applied by the dosing agent injector 42. The exhaust and dosing agent mixture reacts within the SCR catalyst 38 to further reduce exhaust emissions.

Figure 2:
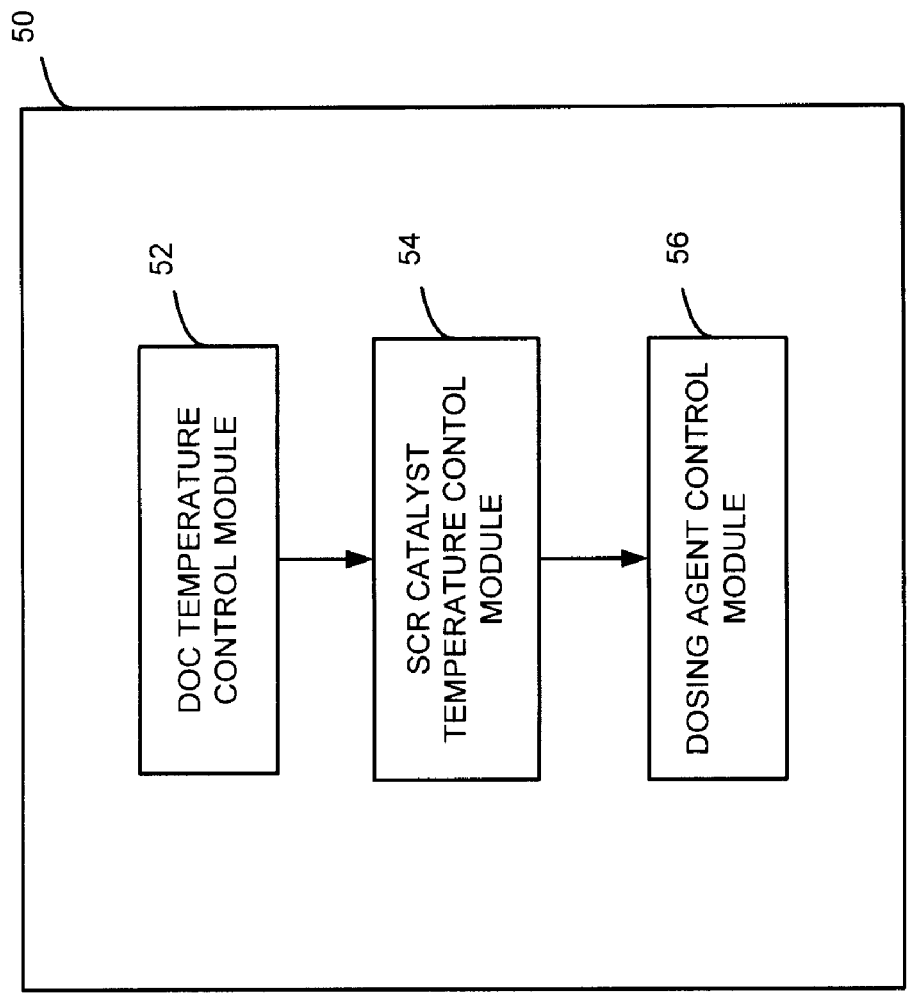
FIG. 2 is a control block diagram of the control module shown in FIG. 1.

With additional reference to FIG. 2, control module 50 may include a DOC temperature control module 52, a SCR catalyst temperature control module 54, and a dosing agent control module 56. DOC temperature control module 52 may be in communication with SCR catalyst temperature control module 54 and may control a temperature of exhaust gas provided by engine 16 to DOC 34 and may determine an operating temperature of DOC 34. Control of the temperature of exhaust gas provided to DOC 34 may include control of combustion parameters for engine 16. For example, DOC temperature control module 52 may adjust an opening of throttle 24 to control an air flow into engine 16. The operating temperature of DOC 34 may be determined by temperature sensor $T_B$.

DOC temperature control module 52 may also control an injection of fuel into cylinder 18. More specifically, DOC temperature control module 52 may control injector 28 to provide for pilot injection of fuel into cylinder 18. Pilot injection includes injection of a small amount of fuel into cylinder 18 prior to the main charge. The pilot charge generally starts to burn before the main charge of fuel is injected, providing for prompt ignition of the main charge without significant delay. A variety of other methods may additionally be employed to increase the exhaust gas temperature provided to DOC 34.

SCR catalyst temperature control module 54 may be in communication with dosing agent control module 56 and may generally control a temperature of exhaust gas provided to SCR catalyst 38 and may determine an operating temperature of SCR catalyst 38. More specifically, SCR catalyst temperature control module 54 may generally control injection of fuel from fuel source 26 to an exhaust gas from cylinder 18. SCR catalyst temperature control module 54 may generally control the temperature of exhaust gas provided to SCR catalyst 38 through a post injection process. During post injection, fuel may be injected into cylinder 18 by injector 28 during an exhaust stroke or into the exhaust flow path from cylinder 18 to DOC 34 by a secondary injector (not shown). Post injection generally provides a quantity of fuel to the exhaust stream for combustion within DOC 34. Post injection may generally provide an increase in the temperature of exhaust gas exiting DOC 34 and being provided to SCR catalyst 38 through the combustion within DOC 34. The operating temperature of SCR catalyst 38 may be determined by temperature sensor $T_C$.

Dosing agent control module 56 may be in communication with dosing agent storage tank 44 and dosing agent injector 42. As indicated above, dosing agent control module 56 may be in communication with SCR catalyst temperature control module 54. Dosing agent control module 56 may generally control injection of a dosing agent into the exhaust gas from engine 16 based on the temperatures controlled and determined by DOC temperature control module 52 and SCR catalyst temperature control module 54, as discussed below.

Figure 3:
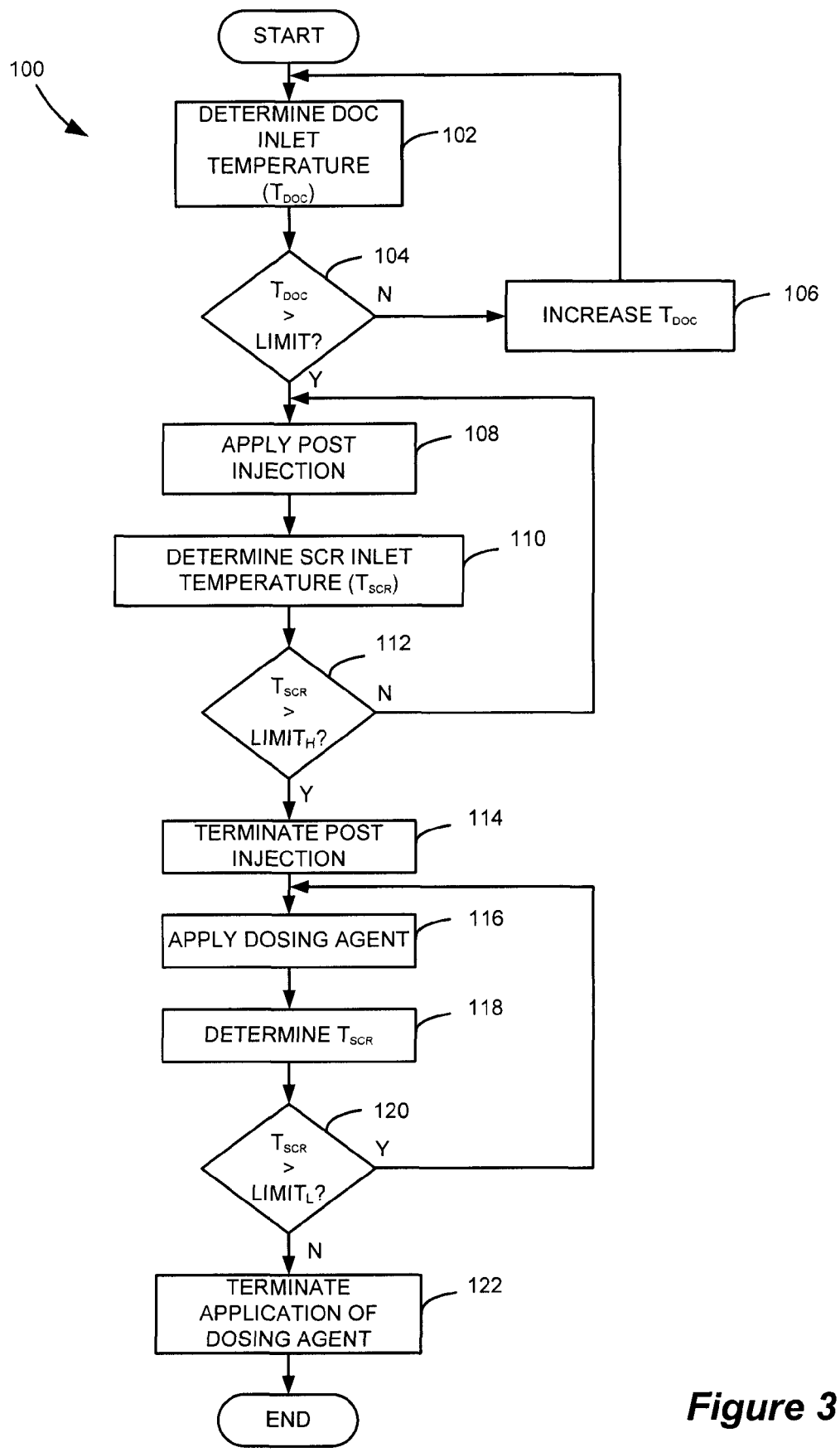
FIG. 3 is a flow diagram illustrating steps for control of the vehicle of FIG. 1.

Referring now to FIG. 3, control logic 100 generally illustrates emissions control for vehicle 10, and more specifically a perturbation control strategy. Control logic 100 may begin at block 102 where DOC temperature ($T_{DOC}$) is determined. $T_{DOC}$ may be determined by temperature sensor $T_B$. Control logic 100 may then proceed to block 104 where $T_{DOC}$ is compared to a first predetermined limit (LIMIT). The first predetermined limit may generally correspond to a temperature greater than or equal to 230° C. If $T_{DOC}$ is below the first predetermined limit, control logic 100 proceeds to block 106 where $T_{DOC}$ is increased. $T_{DOC}$ may be increased in a variety of ways by DOC temperature control module 52, including control of throttle 24 and pilot injection, as discussed above. Control logic 100 may then return to block 102 where $T_{DOC}$ is again evaluated.

If block 104 determines that $T_{DOC}$ is greater than the first predetermined limit, control logic 100 may proceed to block 108 where SCR catalyst temperature control module 52 may apply post injection. As discussed above, post injection generally includes injection of fuel into the exhaust stream provided by engine 16 to DOC 34. Control logic 100 may then proceed to block 110 where SCR temperature ($T_{SCR}$) is determined.

$T_{SCR}$ may be determined by temperature sensor $T_C$. Once $T_{SCR}$ is determined at block 110, control logic 100 may proceed to block 112 where $T_{SCR}$ is compared to a second predetermined limit ($LIMIT_H$). The second predetermined limit may be greater than the first predetermined limit and may generally correspond to a temperature greater than or equal to 300° C. If $T_{SCR}$ is less than the second predetermined limit, control logic 100 may return to block 108 where post injection continues. If $T_{SCR}$ is greater than the second predetermined limit, control logic 100 may proceed to block 114 where post injection is terminated. Once post injection is terminated, control logic 100 may proceed to block 116 where a dosing agent is applied to the exhaust gas.

Application of the dosing agent may be controlled by dosing agent control module 56. The dosing agent may be applied at a location between DOC 34 and SCR catalyst 38. More specifically, the dosing agent may be applied at a location between an outlet of DOC 34 and an inlet of SCR catalyst 38. As discussed above, the dosing agent may include urea. Once the dosing agent has been applied at block 116, control logic 100 may proceed to block 118 where $T_{SCR}$ is again determined. Once $T_{SCR}$ is determined, control logic 100 may proceed to block 120 where $T_{SCR}$ is compared to a third predetermined limit ($LIMIT_L$). The third predetermined limit may be less than or equal to the first predetermined limit and may generally correspond to a temperature less than or equal to 220° C.

If $T_{SCR}$ is greater than the third predetermined limit, control logic 100 returns to block 116 where application of the dosing agent continues. If the $T_{SCR}$ is less than the third predetermined limit, control logic 100 proceeds to block 122 where application of the dosing agent is terminated. Once application of the dosing is terminated at block 122, control logic 100 may terminate, completing one cycle of the perturbation control strategy.

Control logic 100 may generally loop continuously during operation of engine 16. More specifically, a subsequent cycle of control logic 100 may once again begin at block 102. Therefore, the fuel injection at block 108 and the dosing at block 116 may be turned on and off opposite one another to provide the perturbation control strategy. The perturbation control strategy may generally eliminate interference of hydrocarbons (HC) with the NO to NO2 conversion within DOC 34, enhancing NOx reduction within SCR catalyst 38 at temperatures between $LIMIT_L$ and $LIMIT_H$.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   injecting a fuel into an engine exhaust gas provided to a diesel oxidation catalyst (DOC) when a DOC operating temperature is greater than a first limit;
   terminating said injecting when a temperature of a catalyst in communication with exhaust gas exiting said DOC is greater than 300 degrees Celsius;
   beginning injecting a dosing agent into said exhaust gas after said terminating; and
   terminating said injecting the dosing agent when said catalyst temperature is below 220 degrees Celsius.

2. The method of claim 1, further comprising increasing said DOC operating temperature to said first limit before said injecting the fuel.

3. The method of claim 1, further comprising injecting said fuel into said engine exhaust gas after said terminating said injecting the dosing agent.

4. The method of claim 1, wherein said first limit is greater than or equal to 230 degrees Celsius.

5. The method of claim 1, wherein said DOC operating temperature is determined by an exhaust gas temperature at a location between said DOC and said catalyst.

6. The method of claim 1, wherein said catalyst temperature is determined by an exhaust gas temperature at an outlet of said catalyst.

7. The method of claim 6, wherein said injecting the dosing agent includes injecting said dosing agent in said exhaust gas at a location between an outlet of said DOC and an inlet of said catalyst.

8. The method of claim 7, wherein said dosing agent includes urea.

9. The method of claim 1, wherein said first limit is less than 300 degrees Celsius.

10. The method of claim 1, wherein said catalyst includes a selective catalytic reduction (SCR) catalyst.

11. A method comprising:
    injecting a fuel into an engine exhaust gas provided to a diesel oxidation catalyst (DOC) when a DOC operating temperature is greater than a first limit to increase a temperature of a selective catalytic reduction (SCR) catalyst in communication with exhaust gas exiting said DOC;
    terminating said injecting when said SCR catalyst temperature is greater than 300 degrees Celsius;
    beginning injecting a dosing agent into said exhaust gas at a location between said DOC and said SCR catalyst after said terminating; and
    terminating said injecting the dosing agent when said SCR catalyst temperature is less than 220 degrees Celsius.

12. The method of claim 11, wherein said first limit is less than 300 degrees Celsius.

13. A control module comprising:
    a diesel oxidation catalyst (DOC) control module that controls a temperature of a DOC in communication with an exhaust gas from an engine;
    a selective catalytic reduction (SCR) catalyst control module in communication with said DOC control module that controls a temperature of a SCR catalyst by selectively injecting a fuel into said exhaust gas provided to said DOC when said DOC temperature is greater than a first limit, said SCR catalyst control module terminating said injecting when said SCR catalyst temperature is greater than 300 degrees Celsius; and
    a dosing agent control module in communication with said SCR catalyst control module that controls beginning injection of a dosing agent into said exhaust gas after said terminating, said dosing agent control module terminating said injection of said dosing agent when said SCR catalyst temperature is less than 220 degrees Celsius.

14. The control module of claim 13, wherein said first limit is greater than or equal to 230 degrees Celsius.

15. The control module of claim 13, wherein said SCR catalyst control module selectively resumes injection said fuel into said exhaust gas provided to said DOC when said DOC temperature is greater than said first limit after said injection of said dosing agent is terminated.

16. The control module of claim 13, wherein said SCR catalyst temperature is determined by an exhaust gas temperature at a location at an outlet of said SCR catalyst.

17. The control module of claim 13, wherein said dosing agent is injected at a location between an outlet of said DOC and an inlet of said SCR catalyst.

18. The control module of claim 17, wherein said dosing agent includes urea.

* * * * *